United States Patent
Schroeder

(10) Patent No.: US 10,729,154 B2
(45) Date of Patent: Aug. 4, 2020

(54) PROCESS FOR MOLDING FROZEN CONFECTIONS WITH ARTISANAL QUALITY

(71) Applicant: High Road Craft Ice Cream, Inc., Marietta, GA (US)

(72) Inventor: Keith M. Schroeder, Roswell, GA (US)

(73) Assignee: High Road Craft Ice Cream, Inc., Marietta, GA (US)

( * ) Notice: Subject to any disclaimer, the term of this patent is extended or adjusted under 35 U.S.C. 154(b) by 0 days.

(21) Appl. No.: 15/950,602

(22) Filed: Apr. 11, 2018

(65) Prior Publication Data

US 2018/0289033 A1   Oct. 11, 2018

Related U.S. Application Data

(60) Provisional application No. 62/484,188, filed on Apr. 11, 2017.

(51) Int. Cl.
*A23G 9/22* (2006.01)
*A23G 9/28* (2006.01)
*A23G 9/08* (2006.01)

(52) U.S. Cl.
CPC .............. *A23G 9/221* (2013.01); *A23G 9/083* (2013.01); *A23G 9/283* (2013.01)

(58) Field of Classification Search
CPC ........ A23G 9/221; A23G 9/283; A23G 9/083; A23G 9/04; A23G 9/26; A23G 9/44; A23G 9/48; A23G 9/503
See application file for complete search history.

(56) References Cited

U.S. PATENT DOCUMENTS

| | | | |
|---|---|---|---|
| 3,029,750 A | 4/1962 | Burt | |
| 3,080,830 A | 3/1963 | Walter | |
| 4,674,968 A | 6/1987 | Durst | |
| 4,746,523 A * | 5/1988 | Binley | A23G 9/083 |
| | | | 264/28 |
| 4,767,307 A | 8/1988 | Beer | |
| 5,031,567 A | 7/1991 | Daouse et al. | |
| 5,516,549 A | 5/1996 | Cathenaut | |
| 5,738,895 A * | 4/1998 | Fuchs | A23G 9/083 |
| | | | 425/126.2 |
| 5,968,582 A | 10/1999 | Vaghela et al. | |
| 6,534,106 B2 | 3/2003 | Cathenaut et al. | |
| 6,543,248 B2 | 3/2003 | Cathenaut et al. | |
| 7,052,727 B2 | 5/2006 | Franklin et al. | |
| 7,129,309 B2 | 10/2006 | Fehn et al. | |
| 7,407,681 B2 * | 8/2008 | Marchon | A23G 9/28 |
| | | | 426/516 |

(Continued)

*Primary Examiner* — Emmanuel E Duke
(74) *Attorney, Agent, or Firm* — F. Russell Denton; Denton Intellectual Property Law Firm, LLC

(57) ABSTRACT

A process for mass production of round portions of frozen confection. The portions are characterized by an artisanal hand-scooped appearance and distinctiveness, and surface melting characteristics comparable to the manually scooped product. These units are manufactured by hardening in molds that introduce particular features of shape and texture. Furthermore the mold composition allows preservation of subtle differences that result from variations in each portion's internal pressure when the confection expands during freezing.

20 Claims, 10 Drawing Sheets

(56) References Cited

U.S. PATENT DOCUMENTS

| | | | |
|---|---|---|---|
| 7,618,251 B2 | 11/2009 | Steiner et al. | |
| 8,003,149 B2 | 8/2011 | Cheney et al. | |
| 8,425,961 B2 * | 4/2013 | Turek | A23G 1/0076 |
| | | | 219/620 |
| 8,679,566 B1 | 3/2014 | Hancock | |
| 2003/0134025 A1 * | 7/2003 | Vaghela | A23G 9/32 |
| | | | 426/565 |
| 2006/0266915 A1 * | 11/2006 | Parker | A23G 1/205 |
| | | | 249/66.1 |
| 2013/0269371 A1 * | 10/2013 | Lee | A23G 9/083 |
| | | | 62/64 |
| 2014/0079860 A1 * | 3/2014 | Ho | A23G 9/26 |
| | | | 426/515 |
| 2015/0115022 A1 * | 4/2015 | Iwegbu | B65D 75/5888 |
| | | | 229/101.1 |
| 2015/0351426 A1 * | 12/2015 | Ricco | A23G 9/44 |
| | | | 426/101 |

* cited by examiner

PROCESS FOR MOLDING FROZEN CONFECTIONS WITH ARTISANAL QUALITY

FIELD OF THE INVENTION

The invention relates to the field of simultaneously forming and proportioning food items, specifically in forming and discharging round-shaped portions of a frozen confection.

BACKGROUND

Frozen confections such as ice cream, ice milk, frozen yogurt, sherbet, sorbet, glace, gelato and granita have a long history of manual delivery by means of hemispherical scoops. Thus in the minds of consumers these products are associated with round and in particular spherical shapes. Mass production of spheres of frozen confections poses a variety of challenges not only mechanically but also for the visual appeal of the final product, and for its mouth feel.

Preformed balls represent a potentially ideal form for plating and presentation, however they have little if any presence in the market. Partly this is because attempts at molding these balls, e.g., between two hemispherical cavities, have yielded product that has been criticized as too smooth at the surface and or manifesting a visible seam line from the mold joint. In addition they may become modestly deformed under the mechanical and drop forces applied by production lines. One potential remedy is to provide a final coating such as, for example, a couverture chocolate coating, to mask seam lines and other imperfections in the shape or texture, however that solution is satisfactory only when a coated product is desirable.

Various attempts have been made to improve the production speed and appearance of mass-produced round frozen confections. In some cases the aim has been to make the surface smoother. In others it has been to make it look more like hand-scooped product.

Early examples include U.S. Pat. No. 3,080,830 issued to Walter and U.S. Pat. No. 3,029,750 issued to Burt. These disclosures teach a fixed upper half of the mold with a hemispherical cavity, where the mold's bottom half is two hinged movable quadrisphere parts that allow release, and the quadrispheres are heated to maintain a liquid surface on the product to facilitate release of the shaped balls. U.S. Pat. No. 4,674,968 issued to Durst introduces a further improvement with, among other features, a rotatable arc-shaped scraper inside the mold to facilitate shaping and release of formed product without leaving tool marks.

Another illustrative apparatus for continuous manufacture is taught in U.S. Pat. No. 5,031,567 issued to Daouse et al., where a pasty mass is extruded as a roll and cut into essentially spherical portions by means of a diaphragm. The portions are deposited onto a moving conveyor belt, that carries them first through a hardening tunnel—i.e., a low temperature tunnel—and then into a machine to receive a chocolate coating.

U.S. Pat. No. 7,407,681 issued to Marchon et al. notes several difficulties with apparatus such as that of Daouse et al. The critique includes that, before being coated, the product is deformed because the spheres as initially extruded are soft and sag before they can be completely frozen. The diaphragm release mechanism also contributes to a slight teardrop shape with a point at the top, moreover the diaphragm blades leave a mark. Thus the product appears to be imperfect and is regarded as premium in quality only after the coating has been added. Modifications to overcome these effects are not economical and they leave machine marks intact: accelerating hardening by means of a super-cooled tunnel or liquid nitrogen bath.

Thus Marchon et al. teach instead a manufacturing process that produces frozen confectionary products that are said to have even roundness and over 95% cohesion, but which essentially lacks an apex, rough edges, and forming tool marks. There the product is extruded as a roll at no more than −7° C. at constant pressure but slowly enough so that there is no backpressure when it is shaped into a sphere or other round shape by a forming head at the leading edge. The forming head avoids the back pressure by alternating the product flow between two diaphragms, each of which can form a spherical or other rounded shape. The rounded surface of the frozen product as obtained is regarded as smooth, defect-free and suitable for sale of uncoated product.

However the products taught by Marchon et al. have other difficulties. Although identical appreachance and glass-smooth portion surfaces are considered desirable for premium status in the marketplace, super-premium markets prefer confection portions that appear to be artisanal and hand-made even if they are produced in volume. Thus there is an ongoing need for improvements in mass production of formed frozen confections.

SUMMARY OF THE INVENTION

The invention provides a process for mass production of round portions of frozen confection. The portions are characterized by an artisanal hand-scooped appearance and distinctiveness, and surface melting characteristics comparable to the manually scooped product. These units are manufactured by hardening in molds that introduce particular features of shape and texture. The mold composition also allows preservation of subtle differences that result from variations in each portion's internal pressure when the confection expands during freezing.

In a non-limiting particular embodiment the invention provides an improved process for production of formed frozen confections, comprising:
  a) providing a confection mixture;
  b) providing a forming mold wherein:
    i) the mold is comprised of a first part and a second part, wherein each part defines:
      A) a sealing face in which are disposed a plurality of rounded cavities having concave shapes;
      B) a forming surface that defines each cavity, wherein the forming surface consists of a polymeric material characterized by a glass transition temperature of no higher than −10° C.;
    ii) the first and second parts of the mold, when their sealing faces are juxtaposed with respect to each other and the mold is properly closed, together define a plurality of combined cavities, each such combined cavity being characterized in that a cavity in the first part is opposite to a cavity in the second part;
    iii) the parts of the mold further define a plurality of orifices, such that each combined cavity is characterized by the presence of at least one orifice; and
    iv) one or more of the cavities of at least one of the first and second part of the mold defines in concave form at least one supplemental feature selected from the group consisting of a shape feature and a surface texture, and the surface of the mold for the supplemental feature is comprised of the forming surface;

c) juxtaposing the sealing faces of the first and second parts of the mold to properly close it and define a plurality of said combined cavities;

d) injecting the confection mixture through at least one orifice per said combined cavity to fill each such cavity;

e) hardening the confection mixture in the filled, properly closed mold, wherein the hardening is performed at a temperature that is in a range for which the upper end is 0° C. and the lower end is above the glass transition temperature of the polymeric material of which the forming surface consists; and f) separating the first and second parts of the mold following the hardening step and removing the formed, hardened confection mixture therefrom.

DETAILED DESCRIPTION OF THE INVENTION

Definitions

Figure 1:
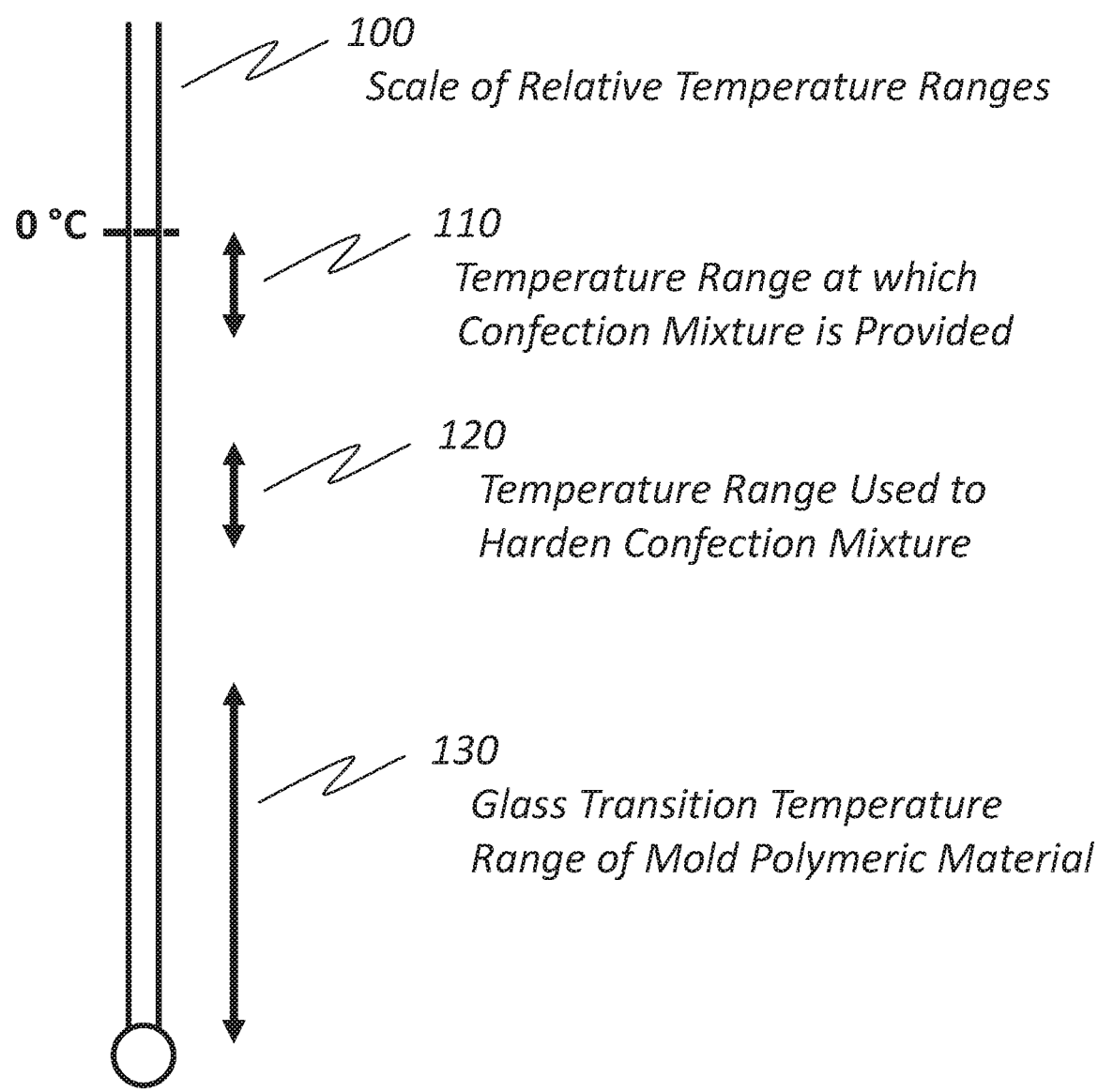
FIG. 1 depicts a caricature of a thermometer against which relative ranges of temperature are shown qualitatively for a confection mixture, hardening step, and the mold polymeric material's glass transition temperature, for a nonlimiting embodiment of a process according to the invention.

The invention may be better understood by consideration of the following definitions for the terms as used herein.

"Confection" means a food dish or delicacy made with sweet ingredients

"Frozen confection" means a confection that has been held at a low temperature until frozen, and for which any part of it remains frozen. Non-limiting illustrative examples include ice cream, ice milk, frozen yogurt, sherbet, sorbet, glace, gelato, granita, as well as reduced-fat and reduced sugar variations of those. The term frozen confections as used herein encompasses both dairy-based and non-dairy-based products. Definitions are briefly provided for these terms. Ice cream is a cream-based frozen product, often with milk and sweeteners added and with up to 60% or more air by volume whipped in. It has the following categories: premium (11-15% butterfat); regular (10-11% butterfat); economy (10% butterfat); lite (either 50% less fat or 33% fewer calories than regular ice cream from the same manufacturer); reduced fat (25% less fat than regular from the same manufacturer); ice milk (old category, largely replaced by reduced fat version); soft serve (same as regular but prepared at higher temperatures); French style (custard base including egg yolks; also called glace); and gelato (20% air as opposed to 60% for ice cream). Other frozen confections include: sorbet (frozen fruit puree, dairy-free); sherbet (sorbet-like, but with milk and no more than 2% butterfat); granita (sorbet-like but not whipped; granular and crunchy due to ice crystals); and frozen yogurt (replaces cream with yogurt).

The term "frozen" as used herein with respect to confections means that the composition comprises water and has been held at a temperature of 0° C. or below until aqueous components throughout the composition form ice crystals; the ice crystals optionally may be of any size. Non-limiting illustrative embodiments of that temperature include: ≤0° C.; ≤−2.5° C.; ≤−5° C.; ≤−7.5° C.; ≤−10° C.; ≤−12.5° C.; ≤−15° C.; ≤−17.5° C.; ≤−20° C.; ≤−22.5° C.; ≤−25° C.; ≤−25° C.; ≤−27.5° C.; ≤−30° C.; ≤−35° C.; ≤−40° C.; ≤−45° C.; ≤ and ° C.; ≤−50° C.

"Hardening" of the confection mixture means chilling it until it is frozen.

"Hardening step" means the molding step during which the confection mixture is held at freezing temperatures.

"Period" as used with respect to hardening means the amount of time for which the confection mixture is chilled at a hardening temperature or range of hardening temperatures.

"Forming" confection mixture means shaping it by means of a mold during hardening.

"Formed frozen confection" means a frozen confection that has been molded to yield a particular shape before, during or after freezing of the confection. In particular embodiments of the invention the forming is performed during the freezing. "Process for production of formed frozen compositions" means the steps for shaping the frozen confections.

"Mold" and "forming mold" are used synonymously herein, and mean a mold for imparting a shape to a confection placed therein. Typically the mold has at least a concave surface for defining the desired shape, such as a hollow cavity to define a hemispherical solid of the molded composition, but the invention is not so limited.

Molds of the invention have a "first part" and a "second part": each contains a plurality of cavities; when the two parts are pressed together properly the cavities on the two parts are opposite each other and define a shape when filled, such as a sphere or other shape. In some embodiments during molding the parts are held side-by-side and substantially horizontally, one being lower and the other being higher, and they seal in the middle when pressed together. In certain embodiments the parts are held together side-by-side and vertically during molding. In various other embodiments the parts are held together side-by-side and at some other angle during molding.

"Hinge" as used with respect to joining first and second parts of a mold means that they are hinged in a manner that, when the hinge is closed, mates their sealing faces to be juxtaposed at an interface, and when the hinge is open separates the sealing faces.

"Clamped together" as used with respect to first and second parts of a mold means that their sealing faces are juxtaposed at an interface, and that the two parts are held together to prevent separation, such as by a clamp, pin, tying means, other pressure, or otherwise fixing them in juxtaposed position.

"Sealing face" on a mold part means the surface that meets and is juxtaposed with another mold part when the first and second parts of the mold are pressed together. "Juxtaposed" means that the sealing face of one mold part is placed against the sealing face of the other. "Interface" between juxtaposed mold parts means area defined where the respective sealing faces are in contact with one another.

"Topography" of an interface means the relative configuration of raised and lowered areas on that interface relative to a plane defined by the average values for its point locations. In certain embodiments the topography may be planar, corrugated (i.e., having parallel ridges), waffle-patterned (i.e. having raised surfaces like those of a waffle), wavy in two dimensions (i.e., having parallel ridges running in orthogonal directions), or some other topography in which the interface defined by sealing surfaces having complementary shapes for the first and second parts of the mold.

"Forming surface" with respect to a mold means the surface of the mold that is in contact with the confection mixture during hardening.

"Properly closed" means that the first and second parts of the mold are aligned when they are juxtaposed, in the same manner that they would be for filling with confection mixture.

"Separating" the first and second parts of a mold means that they are brought apart from one another after having been held in the properly closed position.

"Cavity" means a concave feature that is located on the sealing face of a mold part, and that is intended to be filled with the confection mixture. "Rounded cavity" means that the shape of the cavity has curved contours such as that of a sphere, pear, apple, orange or other round shape. "Combined cavity" means a cavity defined by corresponding opposite depressions in the first and second mold parts, i.e., a cavity in one overlaps to at least some degree the cavity in the other. By "opposite" is meant that when the sealing faces of the two mold parts are lined up for the production position and juxtaposed, there is a mutual gap in the sealing face. The "shape" of a cavity is the profile defined by its forming surface respectively in the first part and second part. The "size" of a cavity is its volume or alternatively its diameter at the widest point in the cavity. In certain embodiments, the first and second parts of the mold, when in use together, provide a plurality of shapes and sizes of cavities, such that at least two different shapes and or sizes of consumer portions are generated in each production batch.

"Defines in concave form," with respect to a cavity in a mold, means that when the confection mixture has been hardened in such a cavity, upon removal the product has the shape thus defined. E.g., were the product is a frozen sphere, the cavity defines a sphere in concave form, and e.g., the sphere may be made by pairing hemispherical hollows from first and second parts of a mold.

"Supplemental feature" with respect to the combined cavities means a secondary feature, and in particular a shape feature or a surface texture.

"Shape feature" means a distinctive addition to the main shape, for instance if the combined cavities define a sphere, a shape feature may be raised or depressed details such as a belt-like raised band, a circle, a polygon, an image such as a face or other image, text, or a logo.

"Surface texture" means a distinctive surface topography on the main shape, for instance if the combined cavities define a sphere, a texture feature may be raised or depressed such as for bumps like those on the peel of an orange. Other examples include fissures (i.e., depressed lines), stipples (i.e., small dots, whether depressions or raised features), ripples (i.e., waves), crease lines typical of marks left by a scoop's edge (analogous to chenille marks), smooth regions typical of compression by a scoop, and roughness typical of shear forces from a scoop on frozen confections. By "raised" and "depressed" is meant that the texture is produced by extending outwardly or inwardly from the surface, respectively, as in bas relief.

To "mimic the surface melting patterns" of hand-scooped frozen confections" by means of shape features or texture features means that bas relief is provided in one or both mold parts for such patterns, such as sagging drops to resemble melting drops on ice cream "Removing" hardened confection mixture from a mold means that the hardened mixture is taken out of the mold. Generally this is followed by further working of the product, and or by packaging and or cold storage in either order To "store" hardened confection mixture means to store it within the mold, or apart from the mold. In preferred conditions storage is at or below 0° C.

"Portion" as used with respect to hardened confection mixture means a serving portion, such as would be provided to a consumer for immediate consumption, or in the same form as for immediate consumption if it will be stored until a later time.

"Paper-based container" as used for storage of a portion is defined as follows. The "container" is any convenient container a carton optionally with separators, a cup, a bowl, a hollow cylinder, a ruffled cupcake paper, or other container. "Paper-based" means a material derived from wood pulp; non-limiting illustrative examples include paper, cardstock, paperboard, cardboard, wax paper, and the like. "Paper-based surfaces" within which the stored portion comes into contact means those surfaces of such containers that are in contact with and or intended to come into contact with the portion stored in its proximity. In some embodiments the paper-based material is coated with a food-grade wax. "Food-grade wax" there means any wax or waxy substance allowed by the U.S. Food and Drug Administration for use on packaging in contact with food.

"Nominal internal dimensions" of a cavity means the dimensions of a cavity when its mold part(s) is/are not in service. In certain embodiments the dimensions are measured from the center of mass, from an axis, or from an arbitrary point within the cavity.

"Aspect ratio" means the ratio of distances measured along two dimensions. In particular embodiments they are orthogonal dimensions. In certain embodiments the two dimensions are not orthogonal. For prior art molds consisting of metal materials, the aspect ratios of the frozen product are relatively constant from molding to molding, and are substantially identical to those of the mold cavities. For hardening in the present invention the aspect ratios of the hardened products may differ from those of the mold by: ≥1%; ≥2%; ≥3%; ≥4%; ≥5%; ≥6%; ≥7%; ≥8%; ≥9%; ≥ or 10%. In particular embodiments they differ by ≥1%.

The mold parts being "constituted entirely of the same polymeric material" as the forming surface means that the composition of both is substantially identical. In particular embodiments there is no laminated release material at the forming surface, and no release agent applied there.

"Polymeric material" means a material comprising a polymer. In particular embodiments the polymeric material comprises plasticizers, fillers such as fibers or other particles, compatibilizers such as emulsifiers, preservatives such as guanidine species, shape stabilizers such as fumed silica, solvents such as in gels, other additives, and or a plurality of types of polymers such as a polymer blend. In some embodiments the surface of the polymeric material is laminated with a metal or treated with a release agent.

"Polymer" has its usual and ordinary meaning in polymer science and engineering, and includes but is not limited to homopolymers, random copolymers, block copolymers, polymer brushes, cross-linked polymers such as rubbers and other networked polymers, and other polymers.

The terms "glass transition temperature" ($T_g$) and "melt transition temperature" ($T_m$) have their usual and ordinary meaning in polymer science, wherein: the polymer is hard below $T_g$; has a leathery quality between $T_g$ and $T_m$, in some cases exhibiting slow creep under the pressure of gravity forces; and exhibits viscous flow properties above $T_m$. In particular embodiments of the invention, polymeric materials comprise a polymer having a glass transition temperature in the range of: ≤−10° C.; ≤−15° C.; ≤−20° C.; ≤−25° C.; ≤−35° C.; ≤−45° C.; ≤−55° C.; ≤−65° C.; ≤−75° C.; ≤−85° C.; ≤−95° C.; ≤−105° C.; ≤−115° C.; or ≤−125° C. In certain embodiments the polymeric material comprises a silicone polymer having a $T_g$ selected from the range of −55° C. to −125° C.

"Hydrophobic" has its ordinary meaning in organic chemistry and polymer science, e.g., a hydrophobic polymer has a non-polar surface and is poorly wettable by water, as evidenced by the contact angle of a water droplet on its surface.

"Silicone polymer" has its usual and ordinary meaning in polymer science, and means a polysiloxane. A particular embodiment is poly(dimethylsiloxane) (PDMS) elastomers, including cross-linked PDMS, but the invention is not so limited.

"Rubber" means a natural elastomer such as natural rubber, or a synthetic elastomer Non-limiting illustrative synthetic elastomers include poly(cis-isoprene), polybutadine, styrene-butadiene rubbers (SBR), polychloroprene, poly(isobutylene), and nitrile (butadiene-acrylonitrile (NBR)) rubbers, whether saturated or unsaturated in the sense of double bonds in organic chemistry. "Elastomer" means an elastic polymer, and includes both cross-linked thermoset elastomers such as rubbers and uncross-linked thermoplastic elastomers such as polychloroprene.

"Orifice" with respect to a mold means a port for filling the mold with a confection.

"Injecting" confection mixture through a mold orifice means inserting, pouring, or otherwise passing the confection mixture through that orifice into a cavity lying beyond it in the mold.

To "fill" a cavity in a mold with a confection mixture to transfer that mixture into the cavity, displacing air, vaccuum or otherwise void space with the mixture. In particular embodiments substantially all of the cavity is filled by the confection mixture.

To "meter" filling or the filling step means to measure the confection mixture being added to the mold so as to limit or avoid leaving confection mixture an orifice.

"Essentially no confection mixture remains in the orifice" where confection mixture is injected, means that no more than 1% of the volume of the orifice is occupied by confection mixture immediately after that step.

"Inserting a plunger" into an orifice to eject confection mixture means that a rod or other protuberance is inserted into the orifice in a rod-and-piston-like manner to drive out the mixture either around the rod or through a port located elsewhere in the same cavity that is served by the orifice.

"Trimming" the hardened mixture means removing a feature such as frozen residue at an orifice, by pulling, breaking, cutting, shearing, or otherwise removing the unwanted material.

"Compressing" hardened mixture to suppress evidence of its residual presence from an orifice, means applying pressure to reshape and thus disguise the residue.

"Overrun" with respect to confection mixture is the percentage increase in the volume of frozen confection relative to the volume of mix used to produce that frozen confection. E.g., 50% overrun means the addition of 1 part air to 2 parts confection mix. In particular embodiments the invention has an overrun selected from the range of: from 20% to 200%; from 25% to 180%; from 30% to 160%; from 35% to 140%; from 40% to 120%; from 45% to 100%; or from 50% to 80%. In certain embodiments the overrun is in the range of 40% to 120%. In other embodiments the overrun is in the range of 25% to 150%. In further embodiments the overrun is in the range of 28.6% to 54.5% air.

Disclosures of mass produced formed frozen confections in the prior art have at times sought perfection in the guise of glass-like smooth surfaces. However this does not have the same appeal as manually scooped ice cream. The step of rotating the scoop to form a ball of the frozen product introduces sheer stresses, leaving a surface topography that has a texture of small creases, fissures, and scoop lines. Due to the increased surface area this texture increases the melting rate of the surface when it is above the freezing point of the product. And that in turn affects both the appearance and mouth feel of the scooped product.

Moreover the processes of others either leave automated-looking machine marks, or they attempt to erase all such marks. By contrast artisanal scooping does in fact leave marks. And beyond premium markets, super-premium markets desire products that appear to be artisanal even if they are not—handcrafted, custom-scooped, and even the subtle differences that mark individual prepared portions.

The present invention provides in several ways for artisanal touches in mass-produced portions. In particular, unlike hand-scooped portions, perfectly spherical portions have the least surface area per unit of volume of any shape, and thus they are the most resistant to heat transfer and hence are the slowest to melt, typically in a uniform layer that retains the spherical shape. Although that may have some value in minimizing melting during storage at marginal temperatures, the familiar product on consumer tables does melt and at least among gourmets that improves its mouth feel. The present invention introduces molded features such as band shapes and other deviations from orb geometry. When the product is plated for a consumer it is already beginning to melt on the plate and across more exposed parts of the band in a manner similar to the ring of excess that is typically carried by the edges of a scoop. The molds employed in the present invention may further have a cavity profile that creates a fissured appearance and faster short-term melting as a consequence of the presence of higher surface areas on topologically more complex portion forms.

Moreover the present invention exploits the freezing characteristics of water in unique ways to take advantage of the artisanal possibilities. As liquid water cools it behaves like most other liquids, meaning that it contracts. However in cooling from about 4° C. to 0° C. (the freezing point) (ca. 39° C. to 32° C.), water expands slightly. And then upon freezing—a very short transition in temperature—it expands by about 9%. Many frozen confection products contain a substantial quantity of air (e.g., 20% to 65% by volume) and are formed in hard molds, thus the expansion of ice comes essentially at the expense of the air. Then because gases are so dilute at ambient temperature and pressure, the pressure from the ice expansion can be relieved by a small amount of spontaneous off-gassing when the mechanical mold pressure is released.

However premium ice creams contain far less air than do lower-end product, and may deliberately exclude most air. It is common to use partly frozen mixtures in molds, and in the absence of air in the mix this can reduce the amount of expansion by the product during hardening. Moreover mixes are often heterogeneous composites, meaning that the water content in a portion can vary across the dimensions of a standard scoop size, thus they can have local variations in expansion. Hardening confection mixes within a metal mold constrains the confection to the mold's shape, requiring internal flow within the mold to equilibrate the pressure across the solid confection.

The inventors instead use a softer material for molding. In particular, rubbers are useful and accommodate greater expansion by confection mixes with low air content. Also, soft molds may be used to accommodate local differences in expansion within the mold, thereby allowing for subtle variations from portion to portion that result in a more artisan-like appearance. An additional benefit of rubber molds is that they are more likely to flex so that fine features in the product's shape and surface texture remain intact when the hardened confection is released from the mold.

These product irregularities are different from the deformities of the past, where issues such as shape sag, flattening, machine marks, pinching by a mechanical diaphragm and so forth were considered obvious and essentially identical defects on each unit of product. By contrast, in the present invention the shape remains essentially the same at the macroscopic level, for instance the aspect ratio of the portion is approximately the same in each dimension relative to the mold cavity, and yet subtle and varied differences in shape result from batch to batch even when the same mold cavity is used.

The invention may be further understood by the following considerations.

Confection Mix

The invention is particularly useful for frozen confections created from premium ingredients and premium mixtures, however the invention is not so limited. Any confection mixture suitable for ice cream, ice milk, frozen yogurt, sherbet, sorbet, glace, gelato, granita or other frozen confection may be employed. A range of overruns is used in the industry; 50% is standard (ca. 33% air). Premium ice creams have less, such as 35% (ca. 25% air). Equipment is sold for overruns as high as 185% (ca. 65% air), where the high air content is reported to slow melt behavior without sacrificing the creaminess of the mouth feel.

Molding Materials

Elastomers are useful as molding materials, and rubbers in particular are useful. A description of preferred embodiments follows but the invention is not so limited. The material is mechanically robust, unreactive with food products, have a sufficiently low glass transition temperature so as to remain flexible well below the deep-freeze conditions of frozen confection operations (−40° F.=−40° C.), thermally stable for sanitizing washes (e.g., melt transition well above 100° C.), and compressible. Certain grades of certain organic elastomers satisfy these requirements, such as for polyisoprene or polybutadiene. However silicone rubbers are among the most admirably suited for this purpose. Depending on the particular type, silicone glass transition temperatures range from −55° C. (−67° F.) to as low as −125° C. (−193° F.), and silicones are commonly stable to +300° C. And both soft and firm silicone rubbers are about 40% compressible at 40 pounds per square inch of pressure. Hydrophobic polymers are particularly desirable as molding materials because they allow less force to be used during release of the hardened confection.

In certain embodiments the polymeric material is characterized by a glass transition temperature of no higher than −10° C. (i.e., +14° F.).

Parts of the Mold

Two-part molds (e.g., molds with two complementary halves) are particularly useful, and may have oppositely disposed cavities, however the invention is not so limited. The parts of the mold may be connected by a hinge. They may be clamped when a seal is being formed. The interfaces where the two parts come together may be planar, or have a complementary wave profile, complementary corrugated profile, complementary waffle profile, complementary wavy profile both lengthwise and widthwise across the mold, or have complementary male and female features for mating of the two surfaces. In some embodiments the parts of the mold may have the flexible molding surface only where some feature is being formed, such as a band or texture.

Or more preferably there is an first part and second part for the mold, and each is constituted entirely of a flexible polymer.

The parts of the mold may have an orifice at any convenient place for injecting confection mix into a cavity or for allowing overflow to escape—e.g., during expansion of the mixture upon freezing—or, e.g., for allowing air to escape from one orifice leading to a cavity at the same that the cavity is filled from another orifice, whether in the same or different mold part. Such orifices may be at the deepest part of the cavity within the mold part, or may be at the midpoint where the sealing surfaces of the mold parts come together, or may be at any other location of the cavity.

Engineered Forms for Portions

In some nonlimiting illustrative embodiments the mold parts may combine to mold shapes such as spheres, capsules, egg shapes, ellipses, cylinders, cones, hemispheres, polygonal solids, or a shape such as that of a kidney bean, lima bean, pear, apple, lemon, orange, pineapple, strawberry, pumpkin, skull, bowling pin, and the like. In particular embodiments, at its widest point the molded shape has a diameter of 30 to 70 mm, or 30 to 40 mm, or e.g., about 34 mm, for a respective volume of 14 to 180 ml or of 14 to 25 ml, or e.g., 20 to 25 ml, but the invention is not so limited. In some embodiments a single mold part has a plurality of cavities that differ from each other in the shapes or sizes of the forms they mold, whether simultaneously or in the alternate. One or more cavities of a single mold part may further define raised or recessed features such as a circle, polygon, image, text or logo. One or more cavities of a single mold part may further define surface texture such as fissures, stipples, ripples, crease lines typical of marks left by a scoop's edge, smoothness typical of compression by a scoop, and or roughness typical of patterns left by shear forces from a scoop. In certain embodiments the shapes, textures and features sizes are selected for topological characteristics that mimic surface melting patterns of hand-scooped frozen confections, such as the craggy or fissured fine structure at those surfaces.

Filling

Depending on the composition of the mix, a non-limiting illustrative temperature range for providing the confection mixture is −12.5° C. to −5° C. (i.e., ca. +10° F. to +24° F.). A series of illustrative non-limiting ranges includes −17.5° C. to −0° C., −15° C. to −2.5° C., −12.5° C. to −5° C., and −10° C. to −7.5° C. This is below freezing temperatures; the composition is provided not necessarily as a hard monolithic ice but in particulate or slurry form. Depending on the desired speed of encrustation and hardening of the mixture, a non-limiting illustrative temperature range for providing the mold parts is generally at a temperature of ca. −30° C. to −45° C. (ca. −0° F. to −50° F.). A series of illustrative non-limiting ranges includes −10° C. to −80° C., −15° C. to −70° C., −20° C. to −60° C., −25° C. to −50° C., −30° C. to −45° C., −30° C. to −40° C., and about −35° C.

The filling configuration is flexible. This may be leveraged, for instance by use of one or more injectors that mix or inject in parallel two or more flavors into the same cavity, or that inject different flavors into respectively different cavities of the same mold.

Shape Refinement

Filling at an orifice may result in a plug of confection material filling the orifice at the conclusion of later hardening. This may be avoided by metering only exact amounts of confection mix when filling such that the orifice is never filled, or excess may be forced out by inserting a plunger into the orifice, or excess may be trimmed after hardening such as by cutting it off or compressing it at the surface. These processes may be automated as desired.

Post-Formation Handling

After filling, hardening and mold-opening, the portions may be deposited directly into cells arranged in lines and rows in packaging trays below the mold, for example into trays made of thermoformed plastic material or wax-coated paper-based cartons. The trays may be carried by an indexed endless chain moving continuously and slowing down at the time of the deposition or discontinuously step by step, under the respective mold cavity, such that each portion is deposited into a cell. Each tray may be closed with an additional cover over the portions, for example locked onto the tray and preferably made of translucent thermoformed plastic or wax-coated paper-based material.

The formed portions are sufficiently hard at the time of release that their deformation upon further handling in the cold can be negligible, particularly where handling is at deep-freeze temperatures, e.g., −40° C. (=−40° F.). Moreover the process is hygienic because the portions can be deposited directly into sterile packaging without contacting intermediate surfaces.

In certain embodiments the hardening is performed at a temperature that is in a range for which the upper end is 0° C. (32° F.) and the lower end is above the glass transition temperature of the polymeric material of which the forming surface of the mold consists.

Storage of Molded Product

The hardened confections as formed may be stored at deep-freeze temperatures. A useful temperature for this purpose is −40° C. (=−40° F.) but the invention is not so limited. In certain embodiments the portions are stored in cartons comparable to those used for eggs. In various other embodiments the portions are stored in paper-based cartons with paper-based dividers, the surfaces of the cartons and dividers with which the portions will be in contact being pre-coated with wax or complemented by, e.g., wax paper or foil or foam, to avoid unintentional softening of the container by the moisture content of the portions. By paper-based is meant, e.g., materials such as cardstock, corrugated cardboard, and paperboard, but the invention is not so limited.

Drawings

The invention may be further understood by consideration of the Figures provided herein. The embodiments shown and discussed in the Figures as well as in this section are illustrative and non-limiting.

FIG. 1 depicts a stylized thermometer 100 as a scale of temperature ranges, with 0° C. marked for reference. The ranges shown for different features are qualitative and relative in this figure. The temperature range 110 at which the confection mixture is provided is highest; the temperature range 120 used to harden—i.e., chill—confection mixture is lower. The temperature range 130 in which the glass transition temperature $T_g$ of the mold's polymeric material is found is lowest of all. In particularly preferred embodiments none of the three temperature ranges overlap with one of the others, but the invention is not so limited. In certain embodiments the confection mixture is provided at a temperature in the range between room temperature and the bottom end of the hardening temperature range. Although the confection mixture can be granular or slurry-like at low temperature, providing it at a temperature below freezing does not prevent the confection composition from hardening.

Figure 2:
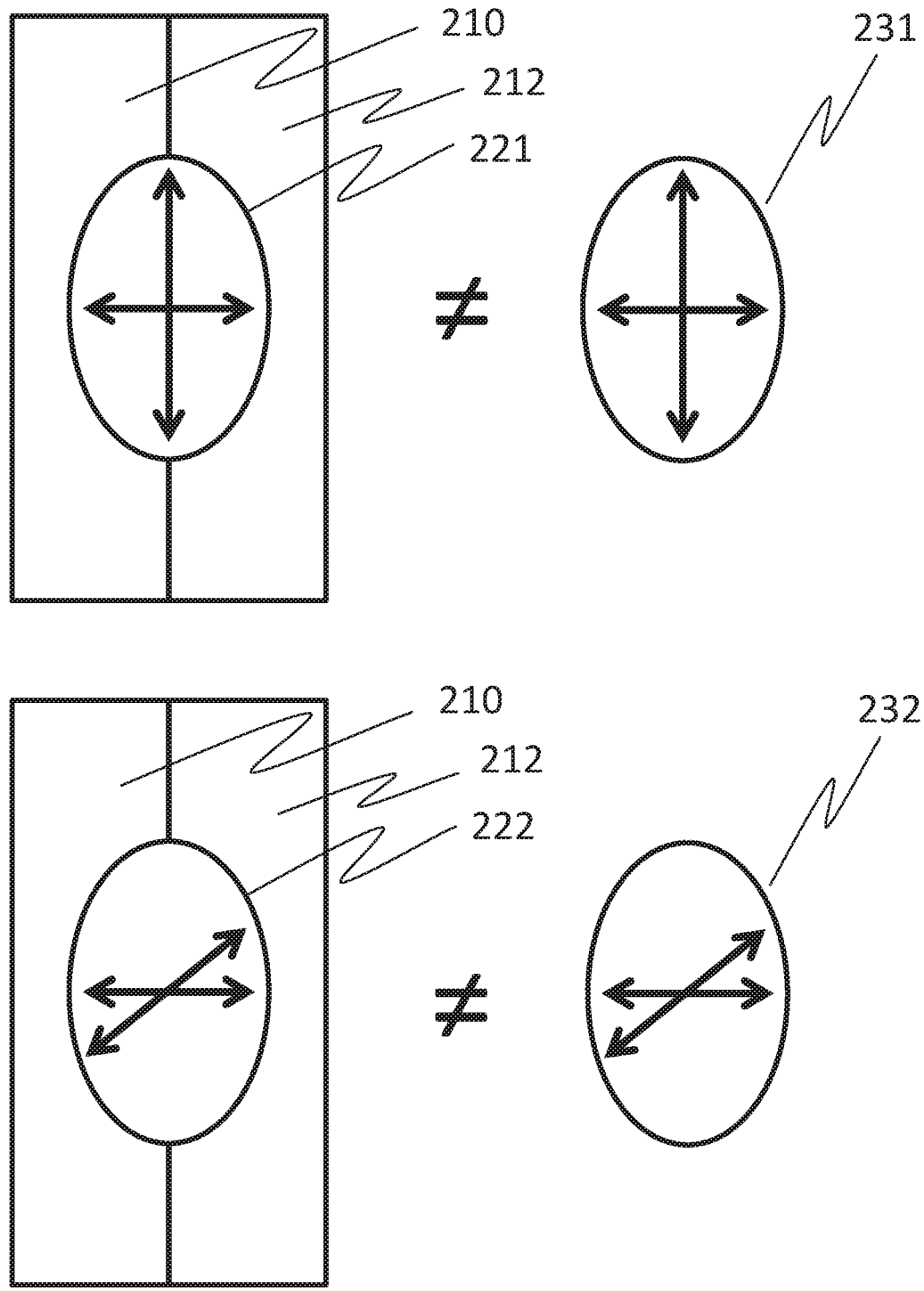
FIG. 2 depicts a caricature of relative dimensions and aspect ratios for a combined cavity in an empty mold and for a confection portion molded therefrom, for a nonlimiting embodiment of a process according to the invention.

FIG. 2 depicts a caricature of aspect ratios. The features 210 and features 220 are the first and second parts of the mold, respectively. The crossed arrows 221 and 222 represent dimensions for two different aspect ratios in the same empty combined cavities of the mold. Aspect ratios are typically stated as the longer dimension (if the two are not equal) relative to the shorter one. Features 231 and 231 are the formed frozen confections as obtained from the mold in a process according to the invention. As stated above metal molds force compositions to flow and conform strictly to the mold dimensions even during freezing, and also confection compositions are somewhat heterogeneous, hence they are capable of hardening to form modestly non-uniform portions. By employing soft molds the present invention allows for small differences between portions in the same run and from batch to batch, making them more artisan-like. Here the mold's nominal aspect ratio of 221 and 222 differs at least slightly from that of the resulting portions 231 and 232 respectively. Aspect ratios are normally defined in terms of orthogonal axes and setting the longest dimension as the length, however the invention is not so limited: the axes may at the user's discretion the axes may be non-orthogonal relative to one another, and the aspect ratio is not necessarily based on the longest dimension or the width. The reason for this is that the non-uniform character imparted by the slight deviations is not limited strictly to length or width differences. In preferred embodiments the nominal dimensions of the empty cavity differ from those of the formed product by at least (one percent (≥1%). Finally, in an unrelated aside, note the sideways orientation of mold parts 210 and 220: such an orientation may be useful, for instance, when gravity feed is desired for filling the cavities by means of orifices and channels that run linearly along the interface, or for instance when injecting confection mixture upward and stopping to avoid filling a channel at the top end that would leave an unsightly plug of unwanted residual material after the hardening step.

Figure 3:
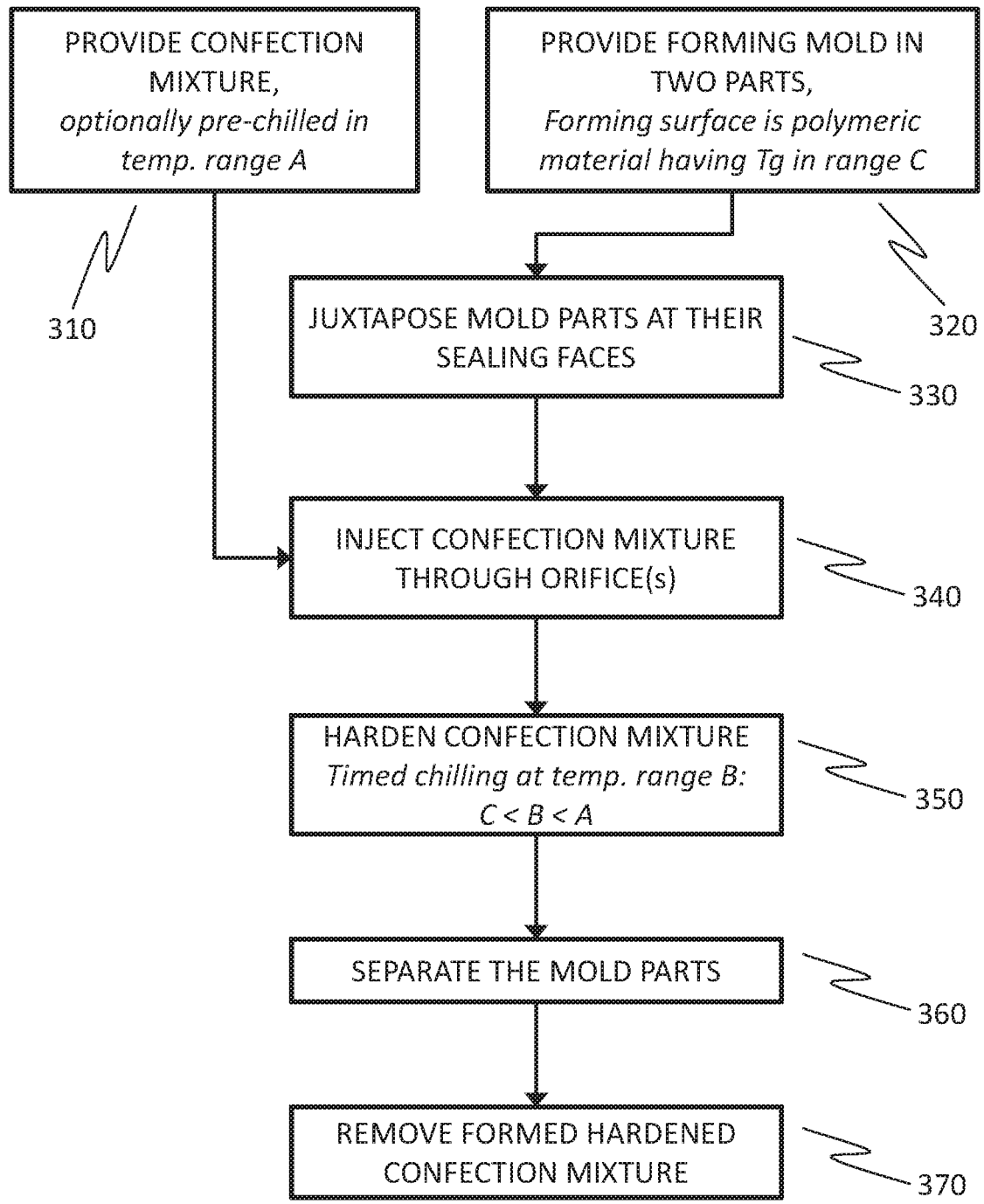
FIG. 3 depicts a caricature of a flow diagram for a nonlimiting embodiment of process steps according to the invention.

FIG. 3 depicts a flow chart for a process according to the invention. At step 310 confection mixture is provided, optionally pre-chilled. The advantage of pre-chilling is that it can potentially reduce the hardening time in the mold, which is the bottleneck for many frozen confection plant. At step 320 the two parts of the formed mold are provided; the mold surface consists of a low-Tg polymeric material, meaning that the polymeric material does not harden until very low temperatures. In particularly preferred embodiments the mold part is of monolithic composition throughout, and is constituted of the same material both in the bulk and at the molding surfaces. Steps 310 and 320 may be performed in either order; also step 310 may be deferred until immediately before it is needed for step 340. The pair of mold parts from step 320 are juxtaposed at step 330 such that their sealing faces are complementary and form an interface when they are thus joined. The mold parts comprise orifices for injecting confection mixture and optionally for extruding the excess. The confection mixture from step 310 is injected into these orifices to fill the cavities in step 340. In particularly preferred embodiments each cavity is entirely filled but the invention is not so limited. The mold parts may be pre-chilled before they are filled, so long as the chilly mold does not freeze the confection mixture so quickly that frozen blockages substantially obstruct the channels from the orifices to the mold cavities in which the confection portions are formed. In step 350 the confection mixture is then hardened at a still lower temperature than that at which the confection mixture is provided. A useful hardening time is 30 minutes but the invention is not so limited. Cold dwell times in the mold may be 5, 10, 15, 20, 25, 30, 35, 40, 45, 50, 55, or 60 minutes, or longer. The mold parts are separated in step 360 and the formed, hardened portions of confection mixture are removed from the mold in step 370. The hydrophobicity and softness of the mold material each facilitate removal of the confection portions without doing undue damage to fine or other molded features that contribute to the artisanal quality.

Figure 4:
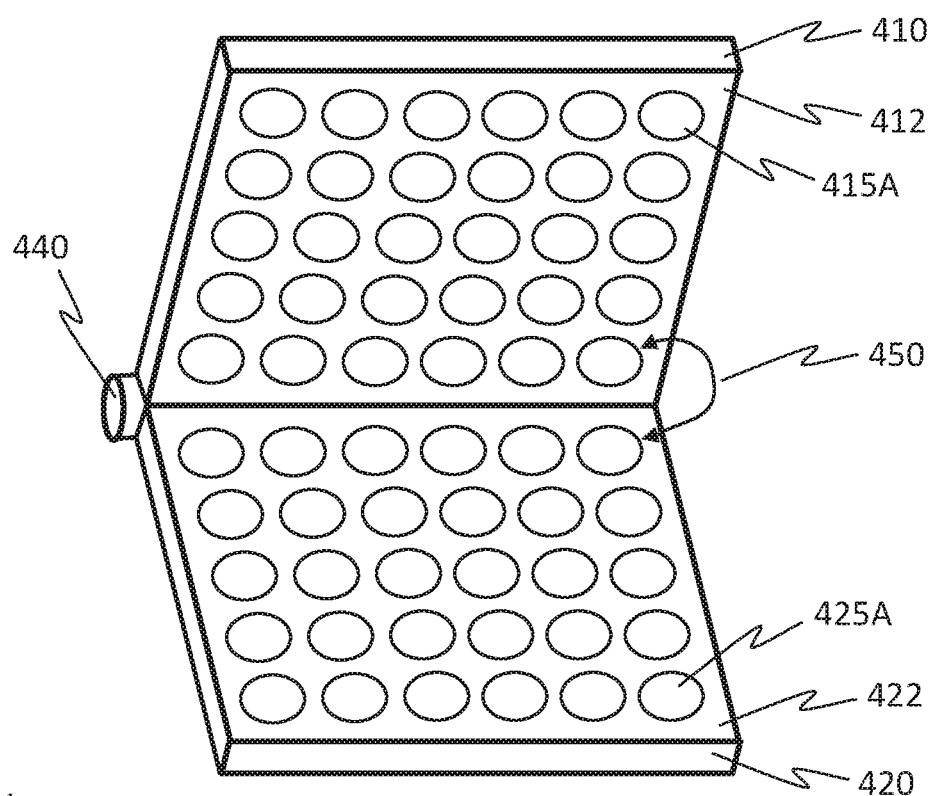
FIG. 4 depicts a caricature for a nonlimiting embodiment of paired mold parts for a process according to the invention, in which the parts are joined by a hinge.

FIG. 4 depicts paired mold parts linked by a hinge on one edge. Here the upper part 410 and the lower part 420 have respective sealing surfaces 412 and 422 that are capable of forming a seal when they are juxtaposed. They have respective cavities such as 415A and 425A which, when mated at the sealing step, form a combined cavity. Arrow 450 highlights the pair-wise opposite and overlapping nature of the cavities on the two parts when hinge action from hinge 440 is closed.

Figure 5:
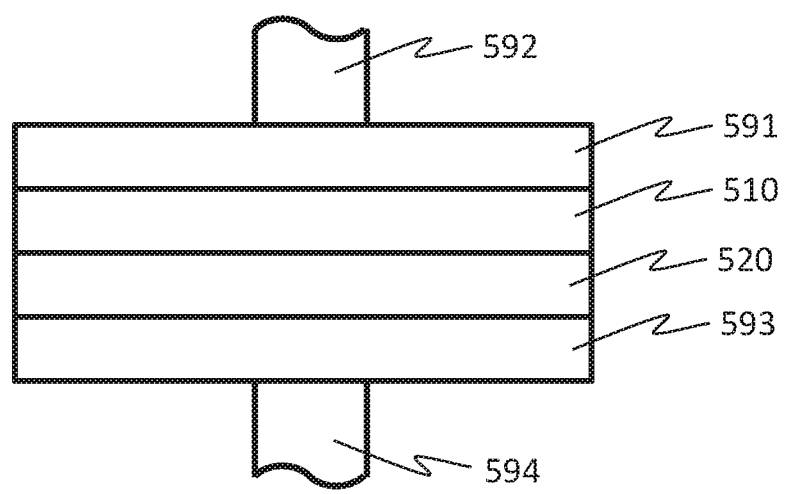
FIG. 5 depicts a caricature for a nonlimiting embodiment of paired mold parts for a process according to the invention, in which the parts are clamped to one another.

FIG. 5 depicts paired mold parts that are engaged by clamping. Here the respective sealing surfaces of upper part 510 and lower part 520 are juxtaposed to form an interface and seal, which is not depicted or numbered in this figure. An upper clamping element 591 weighed down by or propelled by torque from pressure element 592 pushes down on the upper part 510 and optionally applies uniform across the area of mold part 510. A lower clamping element 593 supports or applies upward torque to lower part 520, conveying force in that direction from pressure element 594, and optionally applies uniform across the area of mold part 594. In some embodiments the clamping is by pressure that is no more than unassisted static weight of the upper mechanical components. In certain other embodiments the pressure is supplemented by mechanical torque that is no greater than some value in pounds per square inch (psi), where the value corresponds to the non-molding surface area of the mold. In various embodiments the value is 1, 2, 5, 10, 20, 30, 40, 50, 60, 70, 80, 90, or 100 psi. In alternative embodiments the value is higher.

Figure 6:
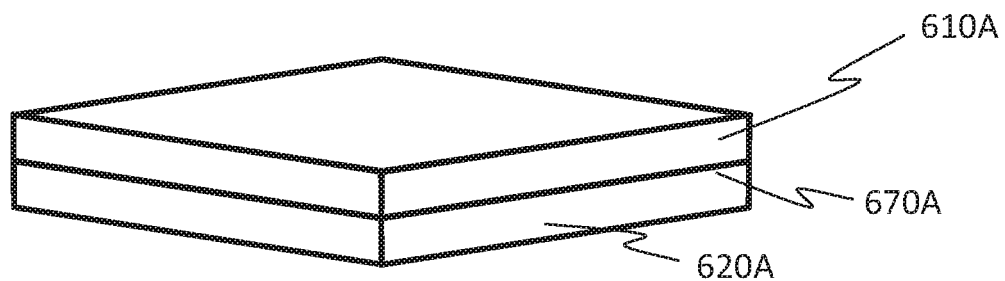
FIG. 6 depicts a caricature for a nonlimiting embodiment of paired mold parts for a process according to the invention, illustrating topographic mating of the respective mold part sealing surfaces at their interface.
Figure 6:
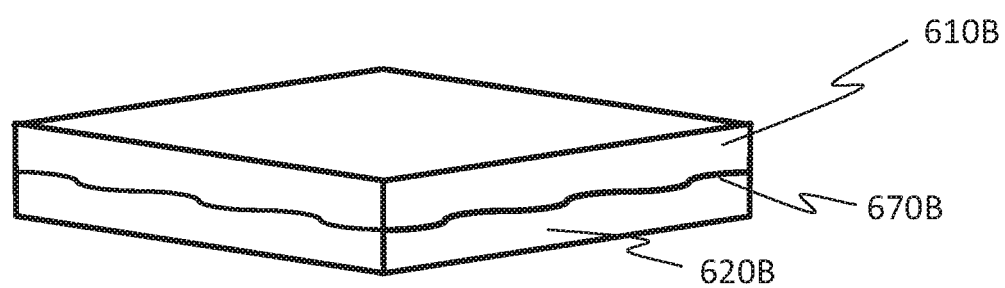
Figure 6:
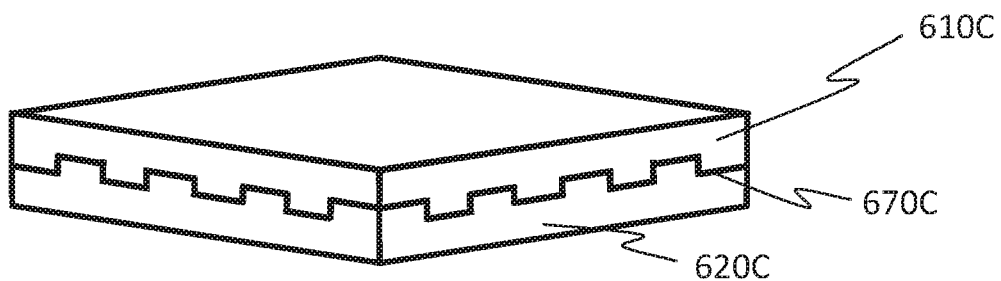

FIG. 6 depicts paired mold parts for which the sealing faces mate with illustrative complementary topographies to form an interface. Elements 610A, 610B and 610C are the upper parts; parts 620A, 620B and 620C are their lower and respective opposite parts. The interface is defined by the sealing surface, not the gaps in it that accommodate cavities. Element 670A is a planar interface. Element 670B is an interface that is wavy in two dimensions. The edge profile of Element 670C can correspond to either a waffle-pattern or alternating-height checked interface. The planar interface can be easier to separate due to its simple interface profile. The checked/waffle interface can better lock the two parts in position relative to each other but complex engagement can increase the level of difficulty for separation. The wavy profile is intermediate between the two.

Figure 7:
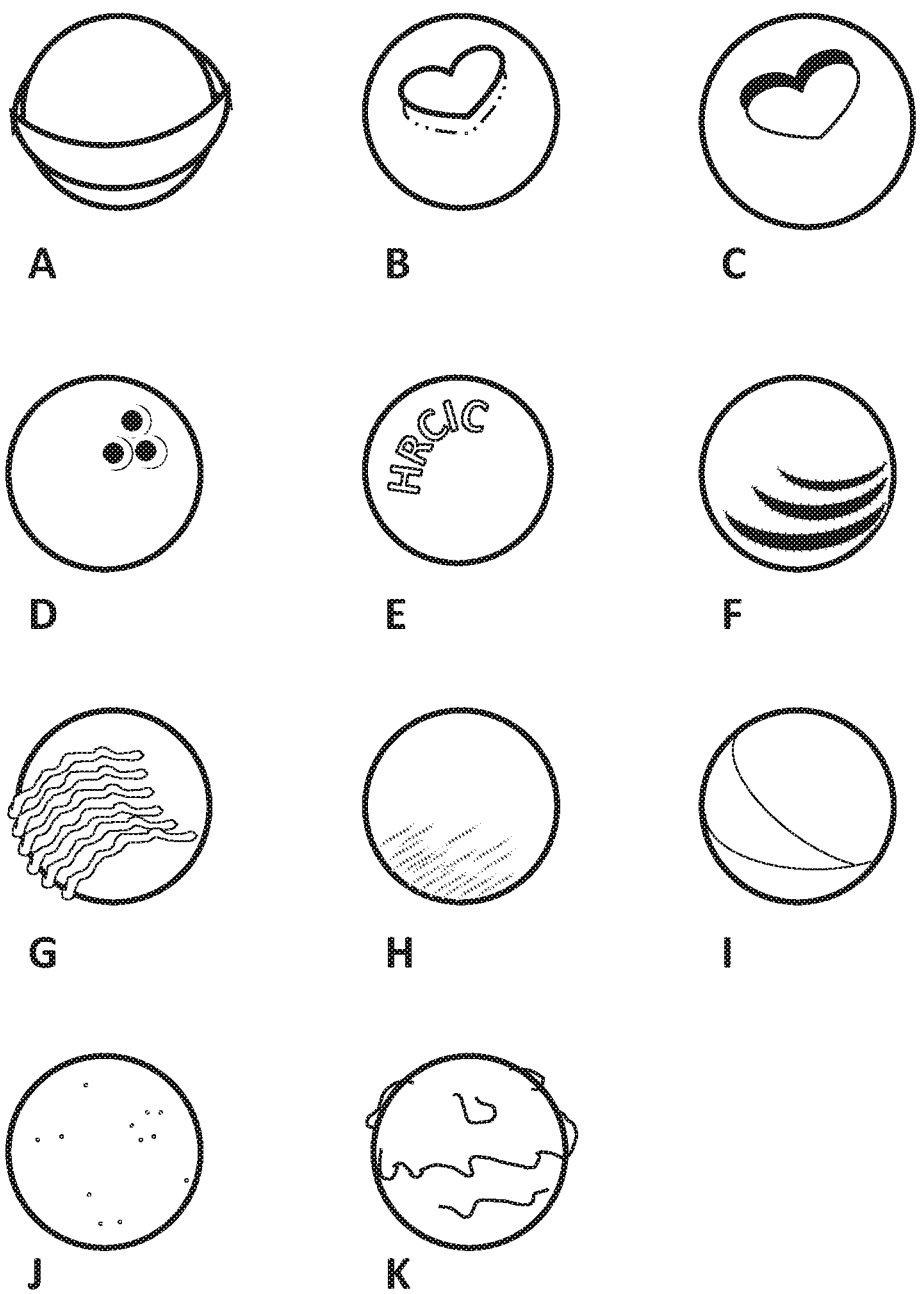
FIG. 7 depicts a caricature for various nonlimiting embodiments of shape and surface textures molded to form frozen confections by a process according to the invention.

FIG. 7 depicts some embodiments for customized round shapes formed by means of a pattern in a mold that may be employed in the present invention. Item A has a molded-in band about the middle, which adds visual interest to the presentation while optionally masking mold lines from an interface. Item B has a molded-in raised heart, and item B has a molded-in recessed heart; either is suitable for weddings, anniversaries, Valentine's Day, baby showers, and the like. Item D mimics a bowling ball with its molded-in pattern. Item E shows molded-in text on the portion; such letters are useful for a slogan, company initials, or personal monogram. Item F depicts molded-in fissures on the portion. Item G depicts a portion with molded-in surface ripples. Item H shows molded-in roughness, to mimic the roughness that is typical of shear forces from a scoop. Item I depicts molded-in crease lines typical of marks left by a scoop's edge. Item J depicts a molded-in stipple pattern. Item K depicts a molded-in imitation of sag lines from frozen confection that is melting.

Figure 8:
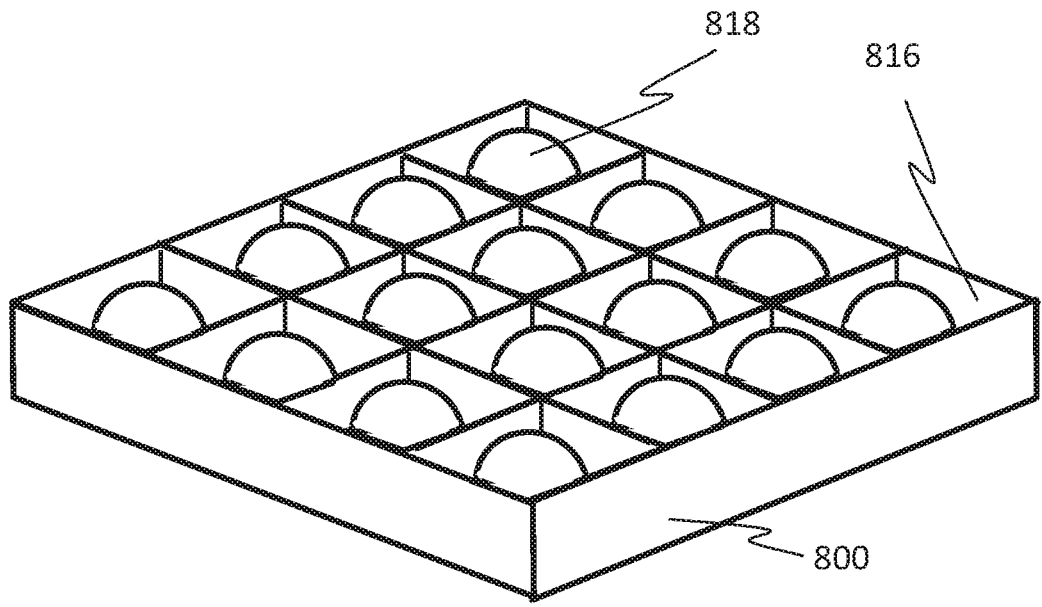
FIG. 8 depicts a caricature for a nonlimiting embodiment of frozen confection portions formed and stored by a process according to the invention.

FIG. 8 depicts storage of products made by a process according to the invention. Because spherical and other portions with rounded shapes can be produced with high artisanal quality on an assembly line, they need suitable mass packaging. Here a partitioned carton 800 of paper-based material (finished cardstock) stores 16 portions, of which 818 is one, and the interior surfaces 816 of partitioned carton 800 are coated with food-grade wax in order to keep the confection portions sanitary, minimize mess, protect the structural integrity of the packaging in case of melting, and enable frictionless filling of the carton with product portions.

Figure 9:
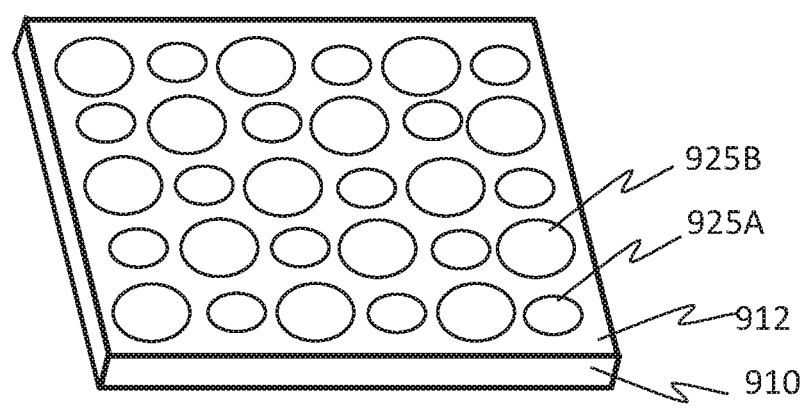
FIG. 9 depicts a caricature for a nonlimiting embodiment of a process according to the invention, in which a mold part is shown for producing two different sizes of frozen confection portions.

FIG. 9 depicts a mold part for use according to the invention process, in which the cavities are of alternating sizes and/or shapes; as shown the profile corresponds to either large and small spheres, or for instance to alternating cylinders and flat ovoids. Element 910 is the mold part. Item 912 is the sealing surface. Element 925A is a cavity for forming a small confection portion, and element 925B is a cavity for forming a large confection portion. Such molds are useful, for example, when both types of portions are ultimately to be provided in the same carton to the end consumer; in this instance the combination could be child-sized and adult-sized portions.

Figure 10:
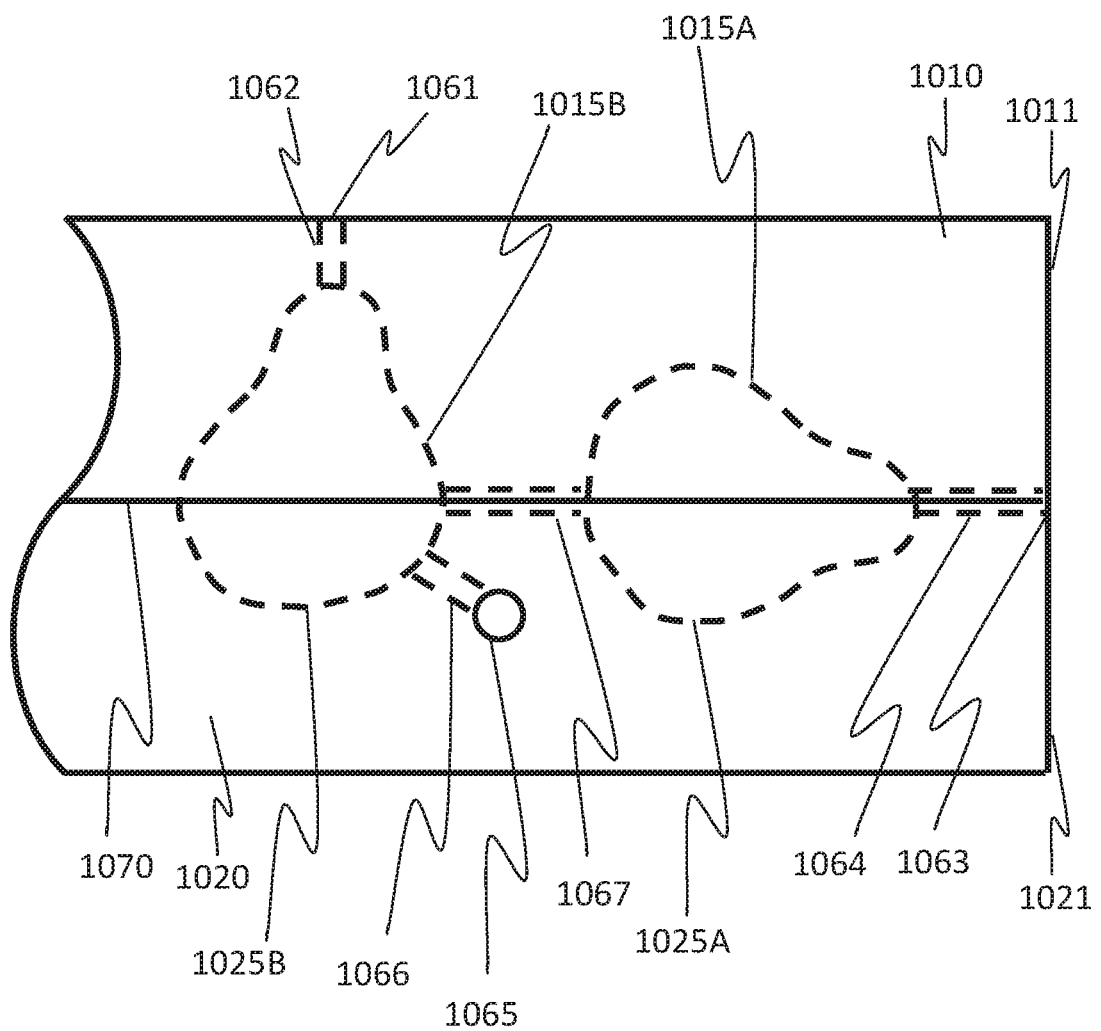
FIG. 10 depicts a caricature for a nonlimiting embodiment for a process according to the invention, in which the combined cavities of two complementary mold parts have pear-shaped concave profiles, and further illustrating features for filling the cavities with confection mixture.

FIG. 10 depicts duct variants for filling combined cavities in a mold. The view is edge-on at the corner of mated mold parts, only part of which is shown; the mold features are in the interior, as shown by dashed lines. Mold parts 1010 and 1020 are mated at their sealing surfaces to form interface 1070; note that elements 1011 and 1021 define the right-side edge of the mold. Complementary cavities 1015A and 1025A form a combined cavity on the right having a prone pear shape, one of many rounded shapes that are convenient to produce by means of the invention process. Complementary cavities 1015B and 1025B form a combined cavity on the left having a standing pear shape. At the deepest (relative to its opposite surface) point of cavity 1015B a channel 1062 connects it to orifice 1061 at the outside top surface. Any of 1061-cum-1062 or the other orifice-and-channel pairs depicted can—at the user's discretion—be used for filling the cavities with confection mixture, or for allowing excess confection mixture to be extruded from the mold part, or for blowing in a gas such as air or applying a vacuum, for instance to facilitate flow of the confection mixture through the channels. The leftward pear cavity defined by 1015B and 1025B has another direct channel, 1066, this one leading to orifice 1065 at the near face of the mold exterior. Element 1066 vents the cavity at a point intermediate between the interface and the cavity's deepest point. Element 1067 is a channel between the rightward and leftward pear-shaped cavities, permitting filling in series from a single orifice in the event that is desired. Element 1067 is located at the interface and is a feature in both of parts 1010 and 1020, though for any reason desired it could be defined by a trough at the interface in only one of parts 1010 and 1020. Element 1064 connects the rightward pear-shaped cavity to orifice 1063 at the right edge of the interface. Note that the channels may extend from the deepest point of a cavity, or along the interface, or from some point intermediate to those. The exact combination of features shown in FIG. 10 is likely not the most efficient arrangement, but illustrates various features of molds and their filling for processes according to the invention.

Figure 11:
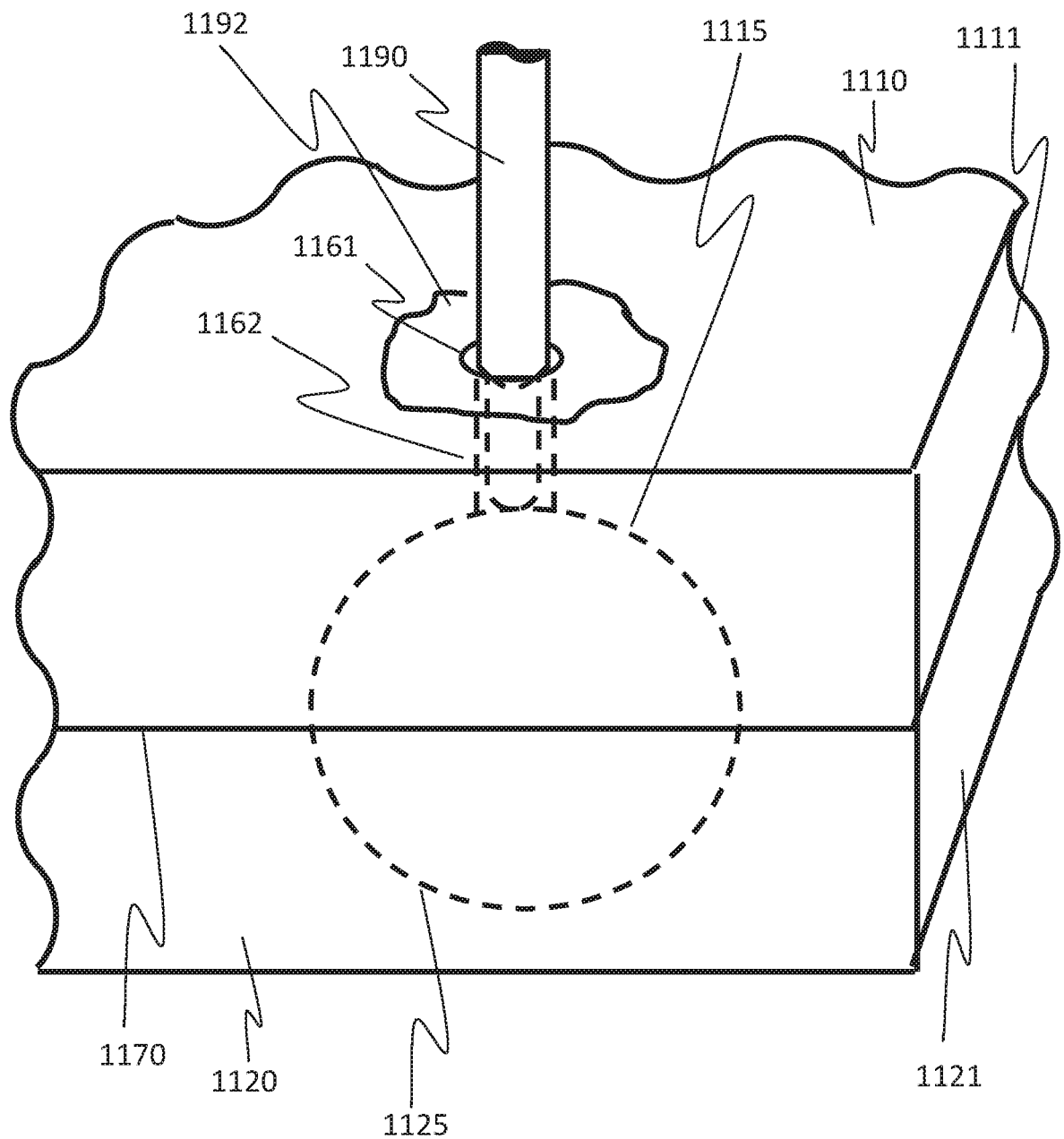
FIG. 11 depicts a caricature for a nonlimiting embodiment for a process according to the invention, in which two complementary mold parts permit ejection of excess confection mixture by means of a plunger.

FIG. 11 depicts a corner of a mold and one cavity defined therein, to illustrate a further step employed in some embodiments of the invention. Mold parts 1110 and 1120 are mated at their sealing surfaces to form interface 1170; Their sides 1111 and 1121 define the right side of the mold here. In this embodiment respective cavities 1115 and 1125 define a combined round cavity from which a channel 1162 extends to an orifice 1161 on the top (i.e. opposite side) of the upper mold part. A rod, 1190, has been inserted in piston-wise fashion into channel 1162, thereby driving out excess confection mixture 1192 from the channel. This is best performed while the confection mixture is not yet fully hardened, and the result is to minimize or masks the machine marks on the surface of the artisanal product. Where the excess confection mixture can be collected in a sanitary manner this may reduce waste and permit recycling in another batch.

Figure 12:
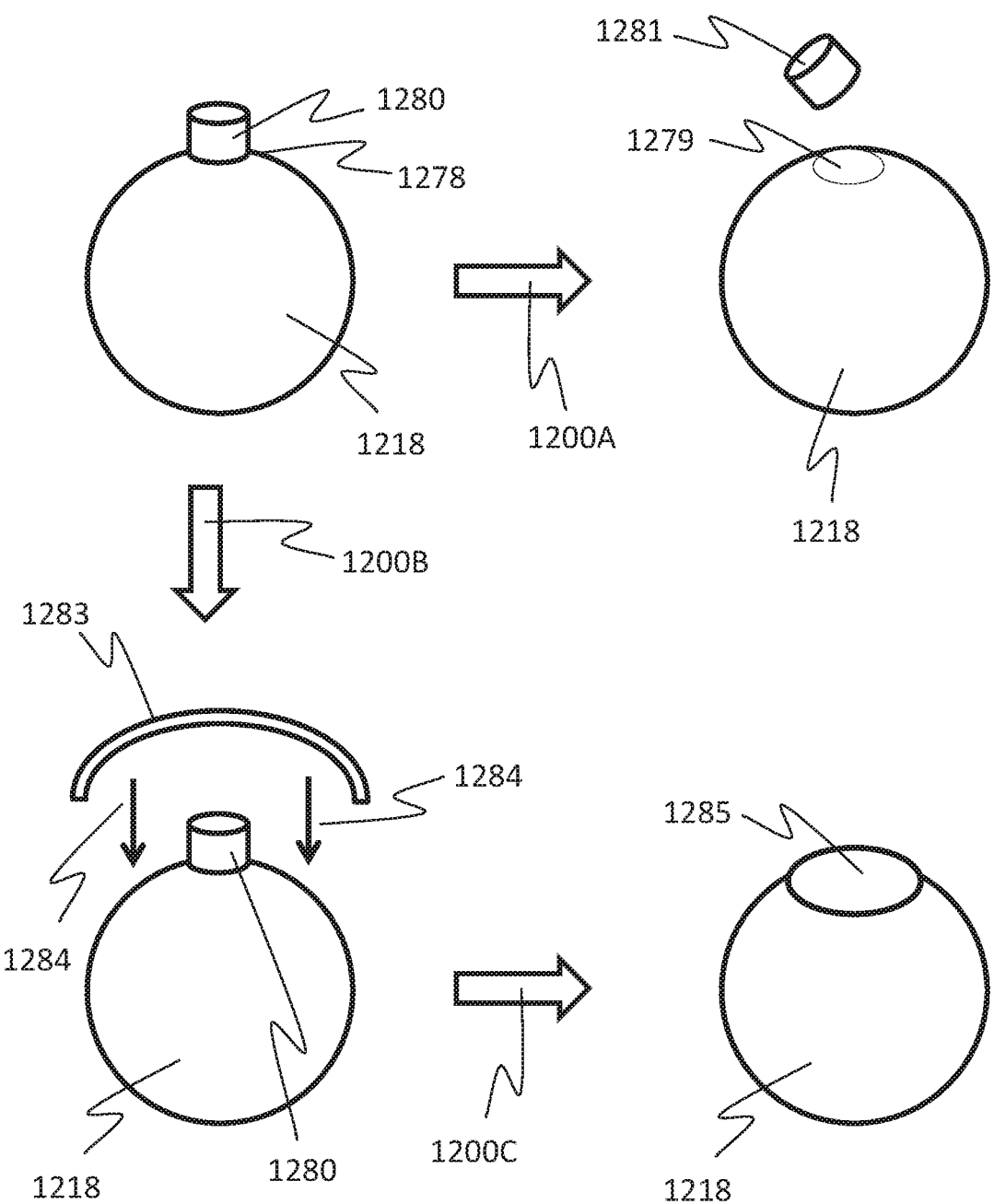
FIG. 12 depicts a caricature for a nonlimiting embodiment for a process according to the invention, in which a formed portion of frozen confection has a residual plug of material from the filling, and it is removed or pressed down.

FIG. 12 depicts an additional step employed in some embodiments of the invention. Following hardening and separation of confection portion 1218 from the mold, a stub 1280 of hardened confection mixture may remain on the portion as residue from a neighboring channel. Customers for artisanal quality frozen confections are quite selective, and dislike such residues, at least in that form. Though such stubs can be exploited during a particular season of the year, e.g., as a mimic of a holiday tree ornament, there is no demand for it the rest of the year. Step 1200A breaks joint 1278 in some fashion, whether by cutting, shearing, pulling, bending, or other means, leaving free-standing material 1281. In some cases this may leave a footprint 1279 of the stub but optionally may be smoothed out. Alternatively to breaking off the stub, there is less waste when step 1200B compresses portion 1218 with a pressure tool 1283, pushing into the stub as shown by direction arrows 1284 to reshape and spread the excess confection material. Step 1200C removes pressure tool 1283, and now portion 1218 has a cap 1285. In some cases signs of reworking are evident in the appearance of cap 1285; in some cases they are not.

The embodiments of the invention as described herein are merely illustrative and are not exclusive. Numerous additions, variations, derivations, permutations, equivalents, combinations and modifications of the above-described invention will be apparent to persons of ordinary skill in the relevant arts and are within the scope and spirit of the invention. The invention as described herein contemplates the use of those alternative embodiments without limitation.

The invention claimed is:

1. An improved process for production of formed frozen confections, comprising: a) providing a confection mixture; and b) providing a forming mold wherein: i) the mold is comprised of a first part and a second part, wherein each part defines: A) a sealing face in which are disposed a plurality of rounded cavities having concave shapes; B) forming surface that defines each cavity, wherein the forming surface consists of a polymeric material characterized by a glass transition temperature of no higher than −10° C. ii) the first and second parts of the mold, when their sealing faces are juxtaposed with respect to each other and the mold is properly closed, together define a plurality of combined cavities, each such combined cavity being characterized in that a cavity in the first part is opposite to a cavity in the second part; iii) the parts of the mold further define a plurality of orifices, such that each combined cavity is characterized by the presence of at least one orifice; and iv) one Of more of the cavities of at least one of the first and second part of the mold defines in concave form at least one supplemental feature selected from the group consisting of a shape feature and a surface texture, and the surface of the mold for the supplemental feature is comprised of the forming surface; c) juxtaposing the sealing faces of the first and second parts of the mold to properly close it and define a plurality of said combined cavities; d) injecting the confection mixture through at least one orifice per said combined cavity to fill each such cavity; e) hardening the confection mixture in the filled, properly closed mold, wherein the hardening is performed at a temperature that is in a range for which the upper end is 10° C. and the lower end is above the glass transition temperature of the polymeric material of which the forming surface consists; and f) separating the first and second parts of the mold following the hardening step and removing the formed, hardened confection mixture therefrom; wherein the filling step leaves confection mixture in the orifice where it is injected, and evidence of the confection mixture presence is suppressed by a step selected from a group consisting of the following: inserting a plunger to eject mixture from the orifice before the portion is hardened; trimming the hardened mixture left by the orifice after the portion is removed from the mold; and compressing the hardened mixture left by the orifice after the portion is removed from the mold.

2. The process according to claim 1, wherein the removed, formed, hardened confection mixture is stored as a portion in a paper-based container, and the paper-based surfaces with which the stored portion comes into contact therein comprise a food-grade wax coating.

3. The process according to claim 1, further having a characteristic selected from the group consisting of the following, wherein:
   a) when the sealing faces of the first and second parts of the mold are juxtaposed relative to each other, they define an interface characterized by a topography selected from a group consisting of the following: planar; corrugated; waffle-patterned; and wavy in two dimensions;
   b) the orifices are located at a site within a cavity selected from one of the following: at the deepest surface of the cavity relative to the sealing face of the respective first or second part; at the interface where the respective sealing faces of the first and second parts come together to define a combined cavity; and at a surface intermediate between the interface and the deepest surface of the cavity;
   c) a hinge joins the first and second parts of the mold; and
   d) the first and second parts of the mold are clamped together during the filling step.

4. The process according to claim 1, further having a characteristic selected from a group consisting of the following, wherein:
   a) a plurality of cavities within a part of the mold have at least one of a different shape or size relative to each other;
   b) one or more combined cavities are characterized by a shape in concave form selected from the group consisting of the following: spherical; capsule-shaped, egg-shaped; bean-shaped; conical; cylindrical; polygonal solid-shaped; pear-shaped; apple-shaped; lemon-shaped; orange-shaped; pineapple-shaped; strawberry-shaped; pumpkin-shaped; skull-shaped; and the shape of a bowling pin; and
   c) the shape feature is selected from the group consisting of the following: a raised band around the middle of the portion; a recessed band around the middle of the portion; a raised circle on the portion; a recessed circle on the portion; a raised polygon on the portion; a recessed polygon on the portion; a raised image on the portion; a recessed image on the portion; raised text on the portion; recessed text on the portion; a raised logo on the portion; and a recessed logo on the portion.

5. The process according to claim 1, wherein the supplemental feature is selected from the group consisting of the following:
   a) a surface texture that is selected from the group consisting of: fissures; stipples; ripples; crease lines typical of marks left by a scoop's edge; smoothness typical of compression by a scoop; and roughness typical of shear forces from a scoop; and
   b) topological characteristics that mimic the surface melting patterns of hand-scooped frozen confections.

6. The process according to claim 1, wherein the mold has a characteristic selected from the group consisting of the following, wherein:
   a) the first and second parts of the mold are constituted entirely of the same polymeric material as the forming surface;
   b) the forming surface consists of a hydrophobic polymer;
   c) the forming surface consists of a silicone polymer; and
   d) the forming surface consists of a rubber.

7. The process according to claim 1, wherein the filling step is metered such that essentially no confection mixture remains in the orifice where it is injected.

8. The process according to claim 1, wherein:
   a) the confection mixture is provided at a temperature in a range from $-12.5°$ C. to $-5°$ C. and the forming mold is provided at a temperature in a range from room temperature down to $-7.5°$ C.; and
   b) the confection mixture is hardened in the filled, properly closed mold at a temperature in the range of $-30°$ C. to $-45°$ C. for a period of at least 30 minutes.

9. The process according to claim 1, wherein the confection mixture has an overrun selected from the range consisting of 40% to 120%.

10. The process according to claim 1, wherein a portion of confection mixture after the hardening step has an aspect ratio that differs by at least 1% from a corresponding aspect ratio for nominal internal dimensions of the respective cavity in which it was hardened.

11. An improved process for production of formed frozen confections, comprising:
   a) providing a confection mixture;
   b) providing a forming mold wherein:
      i) the mold is comprised of a first part and a second part, wherein each part defines:
         A) a sealing face in which are disposed a plurality of rounded cavities having concave shapes;
         B) a forming surface that defines each cavity, wherein the forming surface consists of a polymeric material characterized by a glass transition temperature of no higher than $-10°$ C.
      ii) the first and second parts of the mold, when their sealing faces are juxtaposed with respect to each other and the mold is properly closed, together define a plurality of combined cavities, each such combined cavity being characterized in that a cavity in the first part is opposite to a cavity in the second part;
      iii) the parts of the mold further define a plurality of orifices, such that each combined cavity is characterized by the presence of at least one orifice; and
      iv) one or more of the cavities of at least one of the first and second part of the mold defines in concave form at least one supplemental feature selected from the group consisting of a shape feature and a surface texture, and the surface of the mold for the supplemental feature is comprised of the forming surface;
   c) juxtaposing the sealing faces of the first and second parts of the mold to properly close it and define a plurality of said combined cavities;
   d) injecting the confection mixture through at least one orifice per said combined cavity to fill each such cavity;
   e) hardening the confection mixture in the filled, properly closed mold, wherein the hardening is performed at a temperature that is in a range for which the upper end is $0°$ C. and the lower end is above the glass transition temperature of the polymeric material of which the forming surface consists; and
   f) separating the first and second parts of the mold following the hardening step and removing the formed, hardened confection mixture therefrom;
   wherein a portion of confection mixture after the hardening step has an aspect ratio that differs by at least 1% from a corresponding aspect ratio for nominal internal dimensions of the respective cavity in which it was hardened.

12. The process according to claim 11, wherein the removed, formed, hardened confection mixture is stored as a portion in a paper-based container, and the paper-based surfaces with which the stored portion comes into contact therein comprise a food-grade wax coating.

13. The process according to claim 11, further having a characteristic selected from the group consisting of the following, wherein:
   a) when the sealing faces of the first and second parts of the mold are juxtaposed relative to each other, they define an interface characterized by a topography selected from a group consisting of the following: planar; corrugated; waffle-patterned; and wavy in two dimensions;
   b) the orifices are located at a site within a cavity selected from one of the following: at the deepest surface of the cavity relative to the sealing face of the respective first or second part; at the interface where the respective sealing faces of the first and second parts come together to define a combined cavity; and at a surface intermediate between the interface and the deepest surface of the cavity;
   c) a hinge joins the first and second parts of the mold; and
   d) the first and second parts of the mold are clamped together during the filling step.

14. The process according to claim 11, further having a characteristic selected from a group consisting of the following, wherein:
   a) a plurality of cavities within a part of the mold have at least one of a different shape or size relative to each other;
   b) one or more combined cavities are characterized by a shape in concave form selected from the group consisting of the following: spherical; capsule-shaped, egg-shaped; bean-shaped; conical; cylindrical; polygonal solid-shaped; pear-shaped; apple-shaped; lemon-shaped; orange-shaped; pineapple-shaped; strawberry-shaped; pumpkin-shaped; skull-shaped; and the shape of a bowling pin; and
   c) the shape feature is selected from the group consisting of the following: a raised band around the middle of the portion; a recessed band around the middle of the portion; a raised circle on the portion; a recessed circle on the portion; a raised polygon on the portion; a recessed polygon on the portion; a raised image on the portion; a recessed image on the portion; raised text on the portion; recessed text on the portion; a raised logo on the portion; and a recessed logo on the portion.

15. The process according to claim 11, wherein the supplemental feature is selected from the group consisting of the following:
   a) a surface texture that is selected from the group consisting of: fissures; stipples; ripples; crease lines typical of marks left by a scoop's edge; smoothness typical of compression by a scoop; and roughness typical of shear forces from a scoop; and
   b) topological characteristics that mimic the surface melting patterns of hand-scooped frozen confections.

16. The process according to claim 11, wherein the mold has a characteristic selected from the group consisting of the following, wherein:
   a) the first and second parts of the mold are constituted entirely of the same polymeric material as the forming surface;
   b) the forming surface consists of a hydrophobic polymer;
   c) the forming surface consists of a silicone polymer; and
   d) the forming surface consists of a rubber.

17. The process according to claim 11, wherein the filling step is metered such that essentially no confection mixture remains in the orifice where it is injected.

18. The process according to claim 11, wherein:
   a) the confection mixture is provided at a temperature in a range from −12.5° C. to −5° C. and the forming mold is provided at a temperature in a range from room temperature down to −7.5° C.; and
   b) the confection mixture is hardened in the filled, properly closed mold at a temperature in the range of −30° C. to −45° C. for a period of at least 30 minutes.

19. The process according to claim 11, wherein the confection mixture has an overrun selected from the range consisting of 40% to 120%.

20. The process according to claim 11, wherein the formed, hardened confection mixture, after removal from the mold, lacks or has only suppressed evidence that confection mixture remained in the orifice where it was injected.

* * * * *